United States Patent [19]

Clark et al.

[11] 4,231,021

[45] Oct. 28, 1980

[54] ADDRESS DATA CONVERTER

[75] Inventors: Donald L. Clark, Holliston; William P. Graves, Westboro, both of Mass.

[73] Assignee: GTE Products Corporation, Stamford, Conn.

[21] Appl. No.: 956,554

[22] Filed: Nov. 1, 1978

[51] Int. Cl.[2] .......... G06F 3/00

[52] U.S. Cl. .......... 340/347 DD; 235/311

[58] Field of Search .......... 340/798, 799, 801, 750, 340/347 DD; 364/900, 200

[56] References Cited

U.S. PATENT DOCUMENTS

| | | | |
|---|---|---|---|
| 3,524,976 | 8/1970 | Wang | 235/311 |
| 3,955,189 | 5/1976 | Thomson | 340/799 |
| 4,117,470 | 9/1978 | Elliott | 340/750 |

*Primary Examiner*—Charles D. Miller

*Attorney, Agent, or Firm*—Peter Xiarhos

[57] ABSTRACT

An address data converter for converting binary row address information and binary column address information corresponding to data character display locations of a CRT display device having a row/column display field to binary absolute address information. The address A of a given character display location in a typical display field including a plurality of rows each having 80 character display locations can be represented by $$A = C_A + 80R_A,$$

where $C_A$ is the column address of the display location and $R_A$ is the row address. Since the number 80 in the above expression cannot be represented by an integral power of two, it is ordinarily necessary to provide more than 80, for example, 128, character storage locations in memory for each display row of the CRT display device. In accordance with the present invention it has been recognized that the above expression can also be represented by $$A = C_A + 16R_A + 64R_A,$$

in which the number 16 and 64 can be represented by integral powers of two. In deriving a value of A, four full adders included in the address data converter of the invention are employed to first derive a sum of $C_A + 16R_A$ and to then add this sum to $64R_A$, the total sum representing absolute address information. The absolute address information may then be used to address data characters stored in memory in successive groups of 80 data characters, rather than 128 data characters, thereby reducing overall memory requirements.

6 Claims, 5 Drawing Figures

ADDRESS DATA CONVERTER

The invention herein described was made in the course of a contract with the Department of the Army.

BACKGROUND OF THE INVENTION

The present invention relates to a data converter and, more particularly, to a data converter for a CRT video display system for converting address information in a first format to a second format.

There are many CRT video display systems in which it is desired to display alphanumeric data characters on a CRT video display monitor. These data characters are typically displayed in successive display rows of a monitor with each data character in a row having a specified row and column display location. The data characters to be displayed in rows of a CRT monitor are generally stored in a binary fashion in succession in a storage device, for example, a random access memory (RAM), and addressed by binary address information in a row/column format.

While the abovementioned data storage technique is quite common and acceptable, if the maximum number of data characters which can be displayed in a display row of a CRT display monitor cannot be represented by an integral power of two, the storage device used to store the binary representations of the data characters to be displayed by the monitor ordinarily must have a storage capacity in excess of the maximum number of character display locations in the display field of the display monitor. By way of example, if a CRT display monitor is arranged to have a standard display field of 25 rows of characters with a maximum of 80 characters per row, for a total of 2000 (80×25) character display locations, the storage device required to accommodate this size of display field must have at least $25\times2^7$, or 3200, data character storage locations. The factor $2^7$ thus represents the smallest integral power of 2 to accommodate the 80 display locations. Generally, a storage capacity of 3200 data character storage locations can be provided in a storage device in the form of three discrete 1K random access memories, each having 1024 bits or data character storage locations, and a single 128-bit random access memory providing 128 data character storage locations, for a total of 3200 (3072+128) data character storage locations. Since this number of data character storage locations exceeds the size of the display field (2000 display locations) of the display monitor by 1200 locations (3200−2000) this excess capacity represents substantial unused capacity, specifically, $2^7-80$, or 48, unused locations per display row. Consequently, unnecessary costs are incurred for storage capacity not actually utilized and, in addition, further costs are incurred due to the added labor required to assemble several discrete memory (RAM) devices into a single memory and also to provide necessary additional power supplies for the several memory devices.

BRIEF SUMMARY OF THE INVENTION

In accordance with the present invention an address data converter is provided for converting binary row address information $R_A$ and binary column address information $C_A$ corresponding to data character display locations of a display device having a row/column display field to binary absolute address information. The absolute address information corresponding to each display location is represented by $A=C_A+2^nR_A+2^mR_A$, where n and m are integers.

The address data converter in accordance with the invention includes first and second circuit means. The first circuit means is operative to receive the binary row information $R_A$ and the binary column information $C_A$ corresponding to each character display location of the display field of the display device and in response thereto to produce binary partial summation information representing a binary summation of two of the three expressions in $A=C_A+2^nR_A+2^mR_A$. The second circuit means is coupled to the first circuit means and operates to receive the binary partial summation produced by the first circuit means and the binary row information $R_A$ and in response thereto to produce absolute address information representing a binary summation of the partial summation information and the remaining expression in $A=C_A+2^nR_A+2^mR_A$.

BRIEF DESCRIPTION OF THE DRAWING

Various objects, features and advantages of a data converter in accordance with the invention will be apparent from the following description taken in conjunction with the accompanying drawing in which.

DETAILED DESCRIPTION OF THE INVENTION

Figure 1:
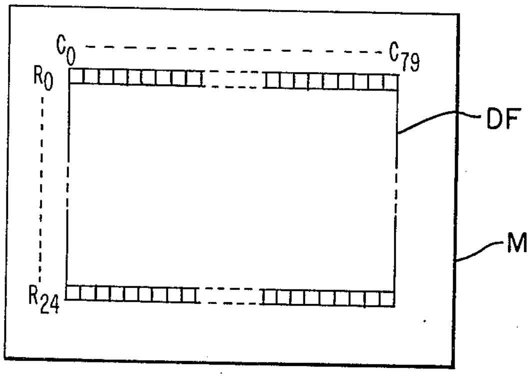
FIG. 1 is a schematic representation of a standard display field of a CRT video display monitor.

Referring now to FIG. 1, there is shown a schematic representation of a standard display field DF for a CRT video display monitor M. As shown in FIG. 1, the display field has a size for displaying up to 25 rows of data characters with each row having a maximum of 80 character display locations, or a total of 2000 (80×25) character display locations. Each character display location may be represented by a row designation or address $R_0$–$R_{24}$ and a corresponding column designation or address $C_0$–$C_{79}$.

Figure 2:
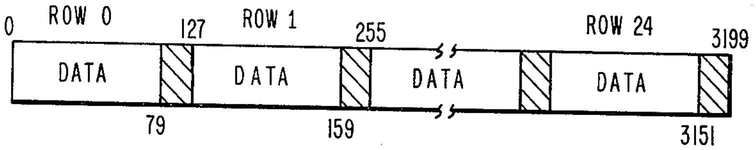
FIG. 2 is a schematic representation of a typical format of storage of data for a display field as shown in FIG. 1.

As discussed previously in the section entitled "BACKGROUND OF THE INVENTION", in order to provide the necessary storage capacity in a memory (e.g., RAM) to store binary representations of data characters to be displayed on a CRT monitor having rows of up to a maximum of 80 character display locations, it is common to provide 128, or $2^7$, character storage locations in memory for each display row of the CRT monitor. This particular number of character storage locations is required since the number "80" cannot be represented by an integral power of 2. (It is noted, for example, that the next smaller power of 2, that is, $2^6$, would provide only 64 storage locations and would be inadequate to accommodate 80 characters). Thus, as shown in FIG. 2, 128 character storage locations would have to be provided in memory for each display row with the first 80 character storage locations being used to store data to be actually displayed in the 80 display locations in the display row and the remaining 48 character storage locations, shown cross-hatched in FIG. 2, representing unused storage locations. For a display field of 2000 (25×80) character display locations, a storage capacity of 3200 character locations would have to be provided, resulting in an excess capacity of 1200 character storage locations. The investment in this excess capacity, in terms of storage costs (cost/bit), is accordingly not fully utilized and, in addition, added costs are incurred in assembling several discrete memory devices (e.g., RAMS) to provide the 3200 character capacity and also in providing additional power supplies for the several individual memory devices.

Figure 3:
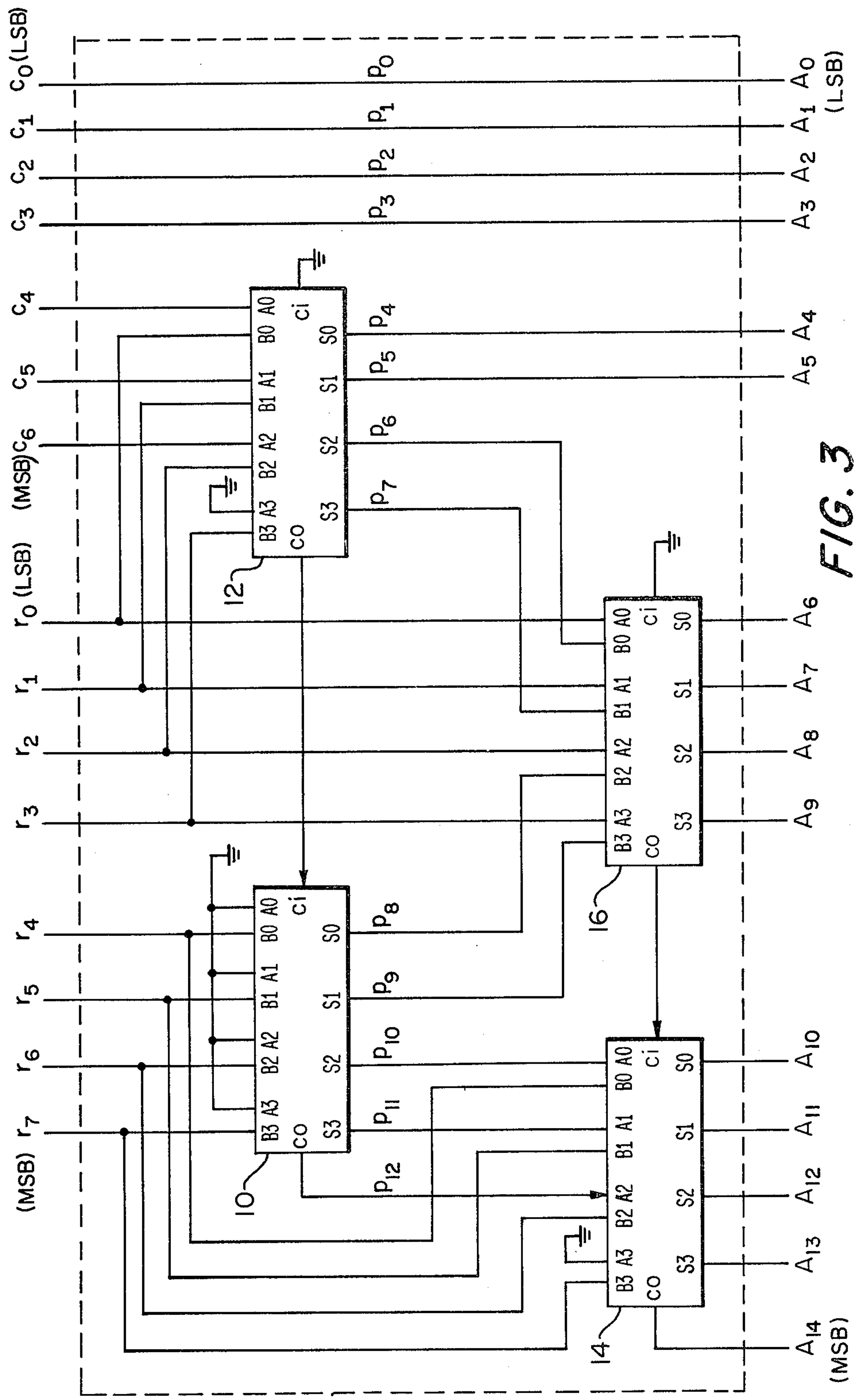
FIG. 3 is a block diagram of a data converter in accordance with the present invention for converting address information in a first, row/column format to a second, absolute address format.

The problems associated with the storage of data characters in a random access memory as discussed hereinabove have been obviated in accordance with the present invention by the provision of a data converter 1 as shown in FIG. 3. The data converter 1, to be discussed in detail hereinafter, is arranged to convert row/column addresses of data characters to be displayed on a CRT display monitor to a different format, termed an absolute address format, which makes it possible for the data characters to be displayed by the display monitor to be stored in successive locations of a memory without the presence of unused storage areas between the rows of stored data characters. The absolute address information, rather than the usual row/column address information, may then be used to read data characters out of the memory to be then displayed by the display monitor. Further, since the overall storage requirements of the memory are less with the present invention than if row/column addressing were to be used, the memory may be constructed from fewer discrete memories than before.

As will also be discussed in detail hereinafter, the conversion operations performed by the data converter 1 in converting address information from the row/column format to an absolute address format utilize simple addition operations rather than multiplication operations, thereby simplifying the hardware implementation of the data converter 1.

The manner in which the data converter 1 is arranged to operate, especially in the performance of its mathematical operations, may best be understood by first considering a standard 80×25 display field of a display monitor as shown in FIG. 1. As can be seen from FIG. 1, the address A of a given character display location in an 80×25 display field can be represented by $$A=C_A+80R_A,$$

where $C_A$ is the column address of the display location, having a value of between 0 and 79, and $R_A$ is the row address, having a value of between 0 and 24.

In the above expression for A, the number 80 cannot be represented by an integral power of 2. As a result, if it is desired to obtain a value for A, especially for the expression $80R_A$, it is ordinarily required to perform multiplication operations. The performance of multiplication operations, as opposed to simple addition operations, is generally time consuming and requires a substantial amount of circuitry. However, it has been recognized in accordance with the invention that the above expression for A can also be set forth as $$A=C_A+2^nR_A+2^mR_A$$

and, for n=4 and m=6, as $$A=C_A+16R_A+64R_A.$$

In this expression, the numbers 16 and 64, unlike the number 80, can be represented by integral powers of 2, namely, $2^4$ and $2^6$, respectively. As will be discussed hereinafter in connection with the details of the data converter 1 of FIG. 3, the representation of the numbers 16 and 64 by integral powers of 2 allows values for the expressions $16R_A$ and $64R_A$ to be derived, specifically, by the data converter 1 of FIG. 3, using simple addition operations rather than the more complex multiplication operations. Further, the value of the expression $16R_A$ can be derived by simply shifting $R_A$ to the left by four bit positions (from the least significant bit, LSB, to the most significant bit, MSB) and, similarly, the value of the expression $64R_A$ can be derived by simply shifting $R_A$ to the left by six bit positions (again from the least significant bit to the most significant bit). Using a typical example, for a row address of, for example, $R_A=9$, and a column address of, for example, $C_A=17$, representing the 18th character position of the 10th row, the binary expressions for $C_A$, $R_A$, $16R_A$ and $64R_A$ are as follows:

| | | MSB LSB |
|---|---|---|
| $C_A$ = | 17 = | 0 0 0 0 0 1 0 0 0 1 |
| $R_A$ = | 9 = | 0 0 0 0 0 0 [1 0 0 1] |
| | | ←4 bits |
| $16R_A$ = | 144 = | 0 0 [1 0 0 1] 0 0 0 0 |
| | | ←6 bits |
| $64R_A$ = | 576 = | [1 0 0 1] 0 0 0 0 0 0 |

As may be noted from the above table, and as previously mentioned, $16R_A$ and $64R_A$ represent 4-bit and 6-bit shifts, respectively, of $R_A$ (from LSB to MSB).

It has further been recognized that if the individual expressions $C_A$, $16R_A$, and $64R_A$ as set forth above are grouped as follows:

$$A=(C_A+16R_A)+64R_A,$$

a value can be obtained for A using a minimum of circuitry and, as previously mentioned, by performing simple addition operations rather than multiplication operations.

Figure 4:
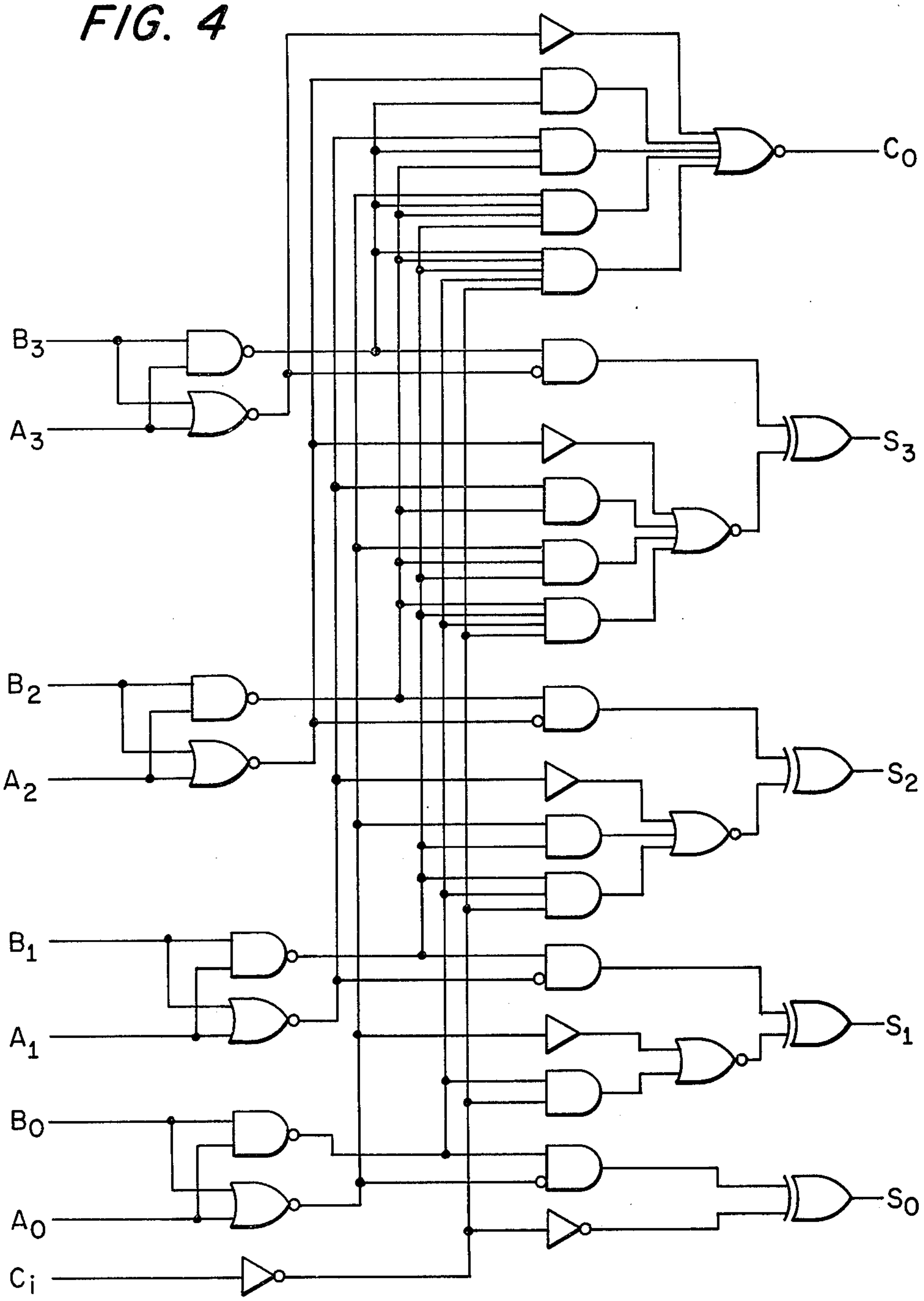
FIG. 4 is a schematic logic diagram of a full adder circuit employed by the data converter of the invention.

Referring now to FIG. 3, the data converter 1 which performs the abovedescribed operation is shown in detail. As shown in FIG. 3, the data converter 1 comprises four full adder circuits 10, 12, 14 and 16. The full adder circuits 10–16 are employed in pairs with the full adder circuits 10 and 12 being used to sum together the values for $C_A$ and $16R_A$ to obtain a partial sum $C_A+16R_A$ and the adder circuits 14 and 16 being used to add together the partial sum $C_A+16R_A$ and $64R_A$. Each of the full adder circuits 10–16 is typically implemented by a combination of logic elements as shown in FIG. 4 and capable of performing AND, OR, EXCLUSIVE-OR and inverter functions. A suitable form for each of the adder circuits is a 74283 full adder as sold by the Texas Instruments Company.

To perform the abovedescribed additions, row ($R_A$) and column ($C_A$) address information, in a binary form, is applied to selected inputs of the four adder circuits 10–16. The row information $R_A$ typically comprises eight parallel bits $r_0$(LSB)–$r_7$(MSB) and the column information $C_A$ typically comprises seven parallel bits $c_0$(LSB)–$c_6$(MSB). The first four row bits $r_0$–$r_3$ of the row address information $R_A$ are applied to inputs $B_0$–$B_3$, respectively, of the full adder circuits 12 and also to inputs $A_0$–$A_3$ of the full adder circuit 16. The remaining four row bits $r_4$–$r_7$ are applied to inputs $B_0$–$B_3$, respectively, of the full adder circuit 10 and also to inputs $B_0$–$B_3$, respectively, of the full adder circuit 14. The first four column bits $c_0$–$c_3$ of the column address information $C_A$ are applied directly to output points $A_0$–$A_3$ and the remaining three column bits $c_4$–$c_6$ are applied to inputs $A_0$–$A_2$, respectively, of the full adder circuit 12. In addition to the above input conditions for the full adder circuits 10 and 12, the inputs $A_0$–$A_3$ of the full adder circuit 10 are placed at binary 0 levels, by grounding these inputs, and, similarly the input $A_3$ of the full adder circuit 12 is placed at a binary 0 level by grounding this input. Each of the binary adder circuits 10 and 12 therefore receives, in effect, two four-bit words, one at its A inputs and one at its B inputs.

In order for the full adder circuits 10 and 12 to perform their particular arithmetic mathematical operations on the row and column bits received thereby, the carry input $c_i$ of the full adder circuit 12 is placed at a binary 0 level, by grounding this input, and the carry output $c_0$ is coupled directly to the carry input $c_i$ of the full adder circuit 10. The carry output $c_0$ of the full adder circuit 10 is coupled directly to the $A_2$ input of the full adder circuit 14. In a similar manner as described above, for the full adder circuits 14 and 16 to perform their particular arithmetic mathematical operations, the carry input $c_i$ of the full adder circuit 16 is placed at a binary 0 level, by grounding this input, and the carry output $c_0$ of the full adder circuit 16 is coupled directly to the carry input $c_i$ of the full adder circuit 14. The carry output $c_0$ of the full adder circuit 14 is coupled directly to a point $A_{14}$.

In addition to the abovedescribed circuit connections, the full adder circuits 10 and 12 are further interconnected with the full adder circuits 14 and 16 by means of outputs $S_0$–$S_3$. Specifically, the outputs $S_0$ and $S_1$ of the full adder circuit 10 are connected, respectively, to the inputs $B_2$ and $B_3$ of the full adder circuit 16, and the outputs $S_2$ and $S_3$ are connected, respectively, to the inputs $A_0$ and $A_1$ of the full adder circuit 14. The outputs $S_2$ and $S_3$ of the full adder circuit 12 are connected, respectively, to the inputs $B_0$ and $B_1$ of the full adder circuit 16, and the outputs $S_1$ and $S_0$ are connected, respectively, to output points $A_4$ and $A_5$. The outputs $S_0$–$S_3$ of the full adder circuit 16 are connected, respectively, to output points $A_6$–$A_9$ and, similarly, the outputs $S_0$–$S_3$ of the full adder circuit 14 are connected, respectively, to output points $A_{10}$–$A_{13}$.

In the operation of the data converter 1, the full adder circuits 10 and 12 operate in response to the row ($R_A$) and column ($C_A$) bits applied thereto to derive an output signal, in binary form, representative of the sum of $C_A$ and $16R_A$, the value of $16R_A$ being derived from $R_A$ by four bit-shifting operations (from the least significant bit to the most significant bit). The full adder circuits 10 and 12 thereby utilize simple addition operations rather than multiplication operations. The output bits representing the sum of $C_A$ and $16R_A$ are designated in FIG. 3 as $p_0$–$p_{12}$ (with the bits $p_0$–$p_3$ being the same as the column bits $c_0$–$c_3$). The above summation operation may therefore be expressed as:

$$\begin{array}{rr} 0\,0\,0\,0\,0\,c_6\,c_5\,c_4\,c_3\,c_2\,c_1\,c_0 & C_A \\ r_7\,r_6\,r_5\,r_4\,r_3\,r_2\,r_1\,r_0\,0\,0\,0\,0 & +\ 16R_A \\ \hline p_{12}\,p_{11}\,p_{10}\,p_9\,p_8\,p_7\,p_6\,p_5\,p_4\,p_3\,p_2\,p_1\,p_0 & P_A = C_A + 16R_A \end{array}$$

The summation of $C_A$ and $16R_A$ as performed by the full adder circuits 10 and 12 as discussed above is added within the full adder circuits 14 and 16 to $64R_A$, the value of $64R_A$ being derived from $R_A$ by six bit-shifting operations (from the least significant bit to the most significant bit). Again, the full adder circuits 14 and 16 utilize simple addition operations rather than multiplication operations. The output bits from the data converter 1 representing the value of $(C_A+16R_A)+64R_A$ are presented as absolute address bits to the output points $A_0$(LSB)–$A_{14}$(MSB). The above summation operation may therefore be expressed as:

$$\begin{array}{r} 0\,p_{12}\,p_{11}\,p_{10}\,p_9\,p_8\,p_7\,p_6\,p_5\,p_4\,p_3\,p_2\,p_1\,p_0 \\ r_7\,r_6\,r_5\,r_4\,r_3\,r_2\,r_1\,r_0\,0\,0\,0\,0\,0\,0 \\ \hline A_{14}\,A_{13}\,A_{12}\,A_{11}\,A_{10}\,A_9\,A_8\,A_7\,A_6\,A_5\,A_4\,A_3\,A_2\,A_1\,A_0 \\ C_A + 16R_A \\ +\ 64R_A \\ \hline A = C_A + 80R_A \end{array}$$

Figure 5:
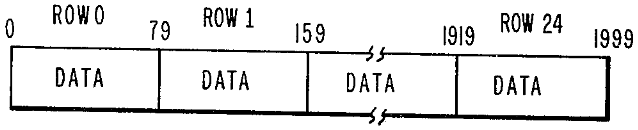
FIG. 5 is a schematic representation of the format of storage of data in accordance with the invention for the display field of FIG. 1.

By use of the data converter 1 as described above, it is possible to store rows of data characters in memory in the manner of FIG. 5, that is, without unused storage areas present between the stored rows of data characters, and to address the memory with absolute addresses as produced by the data converter 1. Thus, the deficiencies of the storage arrangement as shown in FIG. 2 in which much unused capacity is present is clearly avoided. By virtue of the data compression made possible by the present invention, for a display field of 2000 (80×25) display positions, the memory required to store 2000 data characters may typically be implemented by two 1K random access memories, each providing 1024 character storage locations, or a total of 2048 storage locations. The small amount of unused storage locations, specifically, 48 (2048−2000) storage locations, may be used in any desired manner, such as storing test data or any other suitable data. The costs associated with the two 1K memories are substantially less than the aforedescribed memory arrangement employing three 1K memories and one 128-bit memory.

While there has been described what is considered to be a preferred embodiment of the invention, it will be apparent to those skilled in the art that various changes and modifications may be made therein without departing from the invention as called for in the appended claims. By way of example, rather than deriving a sum of $C_A+16R_A$ and adding this sum to $64R_A$ it would also be possible, using full adder circuits, to derive instead a sum of $C_A+64R_A$ and to add this sum to $16R_A$.

What is claimed is:

1. An address data converter for converting binary row address information $R_A$ and binary column address information $C_A$ corresponding to data character display locations of a display device having a row/column display field to binary absolute address information, the absolute address information corresponding to each display location being represented by $A=C_A+2$-

$^{N}R_A+2^{M}R_A]A=C_A+2^4R_A+2^6R_A$, where $C_A$ has a value between 0 and 79, said data converter comprising:

first circuit means operative to receive the binary row information $R_A$ and the binary column information $C_A$ corresponding to each character display location of the display field of the display device and in response thereto to produce binary partial summation information representing a binary summation of two of the three expressions in $A=C_A+2^{N}R_A+2^{M}R_A]A=C_A+2^4R_A+2^6R_A$; and second circuit means coupled to the first circuit means and operative to receive the binary partial summation information produced by the first circuit means and the binary row information $R_A$ and in response thereto to produce absolute address information representing a binary summation of the partial summation information and the remaining expression in $A=C_A+2^NR_A+2^MR_A]A=C_A+2^4R_A+2^6R_A$.

2. An address data converter in accordance with claim 1 wherein:

the first circuit means is operative to produce binary partial summation information representing a binary summation of the expressions $C_A$ and $2^4R_A$; and the second circuit means is operative to produce absolute address information representing a binary summation of the partial summation represented by $(C_A+2^4R_A)$ and $2^6R_A$.

3. An address data converter in accordance with claim 2 wherein:

the expression $R_A$ has a value between 0 and 24.

4. An address data converter in accordance with claim 2 wherein the first circuit means comprises:

a first pair of interconnected full adder means operative to receive bits of the row information $R_A$ and bits of the column information $C_A$ and operative to produce bits at outputs thereof represented by $C_A+2^4R_A$.

5. An address data converter in accordance with claim 4 wherein the second circuit means comprises:

a second pair of full adder means interconnected with each other and with the first pair of full adder means and operative to receive bits of the row information $R_A$ and bits from outputs of the first pair of adder means and in response thereto to produce bits at outputs thereof represented by $C_A+2^4R_A+2^6R_A$.

6. An address data converter in accordance with claim 5 wherein:

the expression $R_A$ has a value between 0 and 24.

* * * * *